US007884305B2

(12) United States Patent
Soltis et al.

(10) Patent No.: US 7,884,305 B2

(45) Date of Patent: Feb. 8, 2011

(54) WELD BEAD SHAPE CONTROL

(75) Inventors: Patrick T. Soltis, Shaker Hts., OH (US); Badri K. Narayanan, Euclid, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1266 days.

(21) Appl. No.: 11/142,547

(22) Filed: Jun. 1, 2005

(65) Prior Publication Data

US 2006/0273077 A1 Dec. 7, 2006

(51) Int. Cl.
*B23K 35/368* (2006.01)

(52) U.S. Cl. .......................... 219/137 WM; 219/146.1; 219/146.24; 219/145.22

(58) Field of Classification Search .............. 219/146.1, 219/146.24
See application file for complete search history.

(56) References Cited

U.S. PATENT DOCUMENTS

| | | | | |
|---|---|---|---|---|
| 1,872,254 | A | | 8/1932 | De Goyler |
| 3,264,447 | A | | 8/1966 | Agnew |
| 3,488,469 | A | | 1/1970 | Buss |
| 4,005,308 | A | | 1/1977 | Chaney et al. |
| 4,186,293 | A | | 1/1980 | Amata et al. |
| 4,423,119 | A | | 12/1983 | Brown et al. |
| 4,551,610 | A | * | 11/1985 | Amata ..................... 219/146.3 |
| 4,689,461 | A | | 8/1987 | Gamberg et al. |
| 4,738,389 | A | | 4/1988 | Moshier et al. |
| 4,827,101 | A | | 5/1989 | Sugitani et al. |
| 4,999,479 | A | * | 3/1991 | Paton et al. ............ 219/145.22 |
| 5,099,103 | A | * | 3/1992 | Yamada et al. ......... 219/145.22 |
| 6,336,950 | B1 | | 1/2002 | Koizumi et al. |
| 6,674,047 | B1 | | 1/2004 | Hughes et al. |

FOREIGN PATENT DOCUMENTS

| | | |
|---|---|---|
| CA | 2235904 | 10/1998 |
| EP | 746127 | 3/1956 |
| GB | 746023 | 3/1956 |
| GB | 746127 | 3/1956 |

OTHER PUBLICATIONS

Liquidmetal Coatings, Application Techniques, 3 pages, (2001) at http://coatings.liquidmetal.com/application.techniques.welding.asp.

Millerwelds, Aluminations (5): Shedding Light on Aluminum Welding Issues, 3 pages, at http://www.millerwelds.com/education/tech_articles.

Harry Sadler, Creating High Quality stick Welds: A User's Guide, Lincoln Electric, 3 pages, at http://www.lincolnelectric.com/knowledge/articles/content/stickweld.

Canadian Official Action.

Effect of Exothermic Additions on Heat Generation and Arc Process Efficiency in Flux-Cored Arc Welding by Yeong-Do Park, Namhyun Kang, Steve H. Malene, and David L. Olson; Metals and Materials International, vol. 13, No. 6 (2007), pp. 501-509.

The Effect of Welding Consumables on Arc Welding Process Control and Weld Metal Structure and Properties by David L. Olson and Robert H. Frost; Center for Welding, Joining and Coatings Research (Jun. 1998).

Response of Exothermic Additions to the Flux Cored Arc Welding Electrode—Part 1 by Malene, SH; Park, YD; and Olson, DL; Welding Journal, vol. 86, No. 10, pp. 293s-302s (Oct. 2007).

Response of Exothermic Additions to the Flux Cored Arc Welding Electrode—Part 2 by Malene, SH; Park, YD; and Olson, DL; Welding Journal, vol. 86. No. 11, pp. 349-s/359-s (Nov. 2007).

Abstract: Exothermically Assisted Shielded Metal Arc Welding by Allen, JW; Olson, DL; and Frost, RH, Aluminum Industry Abstracts, Accession No. 200610-55-46933 (MD); 200610-P.5-06632 (AI); 200610-10-092380 (MT); N00-14906 (AH).

Abstract: Pyrometallurgical, Physical, and Mechanical Behavior of Weldments by Olson, DL and Frost, RH, METADEX database, Accession No. 200704-71-072900 (MD).

* cited by examiner

*Primary Examiner*—Mark H Paschall
*Assistant Examiner*—Brian Jennison
(74) *Attorney, Agent, or Firm*—Hahn Loeser & Parks, LLP; John J. Cunniff

(57) ABSTRACT

Disclosed are techniques and compositions for arc welding consumables such as electrodes that reduce the energy otherwise required for the welding. Particularly, the techniques and electrode compositions can reduce the extent of contamination of weld metal in an arc welding operation. The techniques and compositions promote exothermic reactions during the welding process which reduce the energy otherwise required of the arc. Lower energy arcs can be of shorter length, which thereby reduce the potential for weld contamination by agents from the atmosphere or shielding gas. The techniques and compositions can also be used to selectively tailor shape of the resulting weld, achieve particular weld deposition rates, achieve particular cooling rates and thus influence weld properties, and also enable formation of certain phases in the weld metal.

16 Claims, No Drawings

WELD BEAD SHAPE CONTROL

The present invention relates to the art of arc welding and more particularly, to controlling arc energy. The invention is particularly directed to supplementing lower energy arc welding techniques such that properties and characteristics of welds resulting from higher energy welds can be achieved.

BACKGROUND OF INVENTION

In arc welding with flux-cored electrodes, it is desirable to keep the length of the arc as short as possible. Short arc length minimizes the contamination of the weld metal by oxygen, nitrogen, and hydrogen from the atmosphere or the shielding gas and therefore reduces the need for killing agents, such as magnesium, aluminum, silicon, titanium, and/or zirconium, in the weld. Since both the contaminants and the killing agents can be detrimental to the physical properties of the weld deposit, minimizing the arc length is a way to facilitate improvements in those properties.

However, shortening the arc length, whether by simply reducing the arc voltage or by advanced waveform control techniques, can result in a cold weld puddle, which in turn can lead to poor weld bead shapes (for example, convex or "ropey" shapes) and defects such as lack of fusion and slag entrapment. Accordingly, there is a need for a technique in which arc length can be shortened, while avoiding the problems such as faulty weld bead shape otherwise resulting from short arc length. Additionally, it would be desirable to provide welding consumables, such as electrodes, that are specifically tailored to provide, at a given welding power level or a reduced level, a weld puddle with a predetermined set of characteristics, such as a desired shape or profile.

The rate of metal deposition during a welding process affects the properties of the resulting weld and overall productivity. However, increased gains in productivity from higher deposition rates can be offset by increased energy requirements associated with high energy arc welding processes. Accordingly, it would be beneficial to provide a strategy by which increased deposition rates could be achieved without the attendant increased welding energy demands.

Weld metal properties are influenced at least in part by the cooling rate of the welded assembly, which in turn depends on the temperature of the assembly that is reached during welding. As is known, the weld temperature can be adjusted by adjusting the power input to an arc welder. However, it is often desired to use reduced power levels in view of energy costs. Accordingly, it would be desirable to provide a technique for achieving a particular welding temperature without resorting to increasing welding power levels.

Moreover, achieving particular weld metal compositions is a constant goal in welding technology. Although prior artisans have made considerable advances in such endeavors, producing desired weld metal compositions has primarily been achieved by selecting particular welding consumables, and not by consideration of the power requirements of the welder. As previously noted, increasing energy costs are always a concern. Therefore, it would be beneficial if certain weld metal compositions could be produced while also reducing power demands of the welder. Accordingly, there is a need for a strategy in which particular weld metal compositions can be produced in conjunction with reducing overall power requirements for a welding unit.

All of the noted objectives relate to achieving particular weld characteristics or properties and preferably, without increasing the electrical power to a welding unit.

THE INVENTION

In a first aspect, the present invention provides a method for increasing the thermal energy output of an arc welding unit to a specified amount, of an arc welding unit without increasing electrical power to the arc welding unit. The method comprises utilizing a welding consumable including (i) at least one reactive element and (ii) at least one oxide. These components are selected in amounts and proportions such that at least one exothermic reaction occurs during the arc welding operation between (i) and (ii) which thereby generates the specified amount of energy.

In another aspect, the present invention provides a method for achieving the Same thermal energy output from an arc welding operation, while decreasing electrical power to the arc welder by a specified amount. The method comprises utilizing a welding consumable including (i) at least one reactive element and (ii) at least one oxide. The components are selected, and in amounts and/or proportions such that at least one exothermic reaction occurs during the arc welding operation between (i) and (ii) which thereby generates the specified amount of energy.

These and other objects and advantages will become apparent from the following description taken together with the accompanying drawings.

PREFERRED EMBODIMENTS

In accordance with the present invention, heat is added to a weld during a welding operation by suitable selection of particular components, their amounts, and/or proportions in welding consumables. The added heat is achieved without resort to using a relatively long arc length to thereby still obtain a satisfactory weld bead shape. That is, undesirable weld bead shapes such as a convex shape or "ropey" shape as known in the art, are avoided while using a relatively short arc length, by use of the preferred embodiments described herein.

In addition, pursuant to the present invention, by suitable selection of components, their amounts, and/or proportions in a welding consumable, it is also possible to modify the heat generated in the arc, resulting in the modification of metal deposition rates by using the same energy input.

The present invention strategy also enables modification of cooling rates and thus modifying weld metal properties at the same weld procedure. Modified cooling rates and weld metal properties are achieved by particular selection of components, their amounts, and/or proportions in welding consumables.

Additionally, the present invention enables modification of weld metal composition, and thus control of formation of certain phases in the weld metal. Such is achieved by suitable selection of components, their amounts, and/or proportions in welding consumables. For example, by increasing aluminum in the fill to 20% of the electrode fill, and increasing reactive oxides to suitable extents; excessive amounts of aluminum can be prevented from otherwise going into solid-solution, thus forming delta ferrite upon solidification. Delta ferrite has been established to cause poor toughness in weld metal.

Moreover, the present invention enables modification of operating ranges of electrodes to suit applications by suitable selection of components, their amounts, and/or proportions in welding consumables. For applications requiring high deposition rates, the components in the welding consumables can be selected to thereby allow the electrode to be operated at higher speeds without arc instability, i.e. hotter the arc, more stable is the plasma. For example, in an arc welding application operating at 110 inches per minute, use of the present invention electrode compositions can enable the operating speed to be increased up to 150 inches per minute, an increase of about 36%. For applications requiring a fast freezing puddle, the components in the welding consumable can be selected to allow the electrode to be operated at low enough heat inputs with just enough heat created in the arc for stability.

All of the foregoing strategies are achieved in accordance with the present invention by selection and use of particular compositions for welding consumables. The term "welding consumables" refers to electrodes, fluxes, and other materials used generally as welding feed(s) in a variety of welding operations. The compositions of the present invention utilize particular combinations of materials in particular amounts and/or proportions to promote the release of thermal energy from exothermic reactions that occur during welding and high temperature heating of the welding consumables.

More specifically, the various objectives such as adding heat to a weld without lengthening the arc, can be achieved by including materials in welding consumables such as for example, the core of a flux-cored electrode, that will react with each other exothermically. For example, it is known that aluminum metal and mill scale (iron oxide) can be used as follows:

$$2Al\text{(in the electrode core)}+Fe_2O_3\text{(in the electrode core)}\rightarrow Al_2O_3\text{(in the slag)}+2Fe\text{(in the weld metal)}+heat$$

The aluminum oxide which is formed becomes part of the slag, and the iron which is formed goes into the weld metal. The reaction between aluminum and iron oxide is one of the most exothermic known in the welding arts. This reaction is also known as the "thermite" reaction. Although this is an example of an exothermic reaction, if not specifically tailored as described herein, it is generally unsuitable for use in arc welding and particularly, in applications where flux-cored electrodes are used.

In accordance with the present discovery, various preferred compositions for welding consumables and specifically for electrode compositions, are provided that, due to particular inclusion of reactants and/or amounts of certain reactants, undergo one or more exothermic reactions to thereby generate heat for the resultant weld. The generated heat reduces the electrical power input otherwise required for the arc, and thus, enables the arc length to be relatively short.

Specifically, the preferred embodiment methods and electrode compositions feature various combinations of reactive elements and oxides that undergo exothermic reactions. Examples of these exothermic reactions include, but are not limited to:

$$3Mg+Fe_2O_3\rightarrow 3MgO+2Fe+heat$$

$$3Si+2Fe_2O_3\rightarrow 3SiO_2+4Fe+heat$$

$$3Ti+2Fe_2O_3\rightarrow 3TiO_2+4Fe+heat$$

$$3Zr+2Fe_2O_3\rightarrow 3ZrO_2+4Fe+heat$$

$$4Al+3MnO_2\rightarrow 2Al_2O_3+3Mn+heat$$

$$2Mg+MnO_2\rightarrow 2MgO+Mn+heat$$

$$Si+MnO_2\rightarrow SiO_2+Mn+heat$$

$$Ti+MnO_2\rightarrow TiO_2+Mn+heat$$

$$Zr+MnO_2\rightarrow ZrO_2+Mn+heat$$

In addition to regulating the temperature and fluidity of the weld puddle, reactions like these can be used to regulate the alloy content of the weld metal. These or similar reactions can add desirable alloying elements, for example, manganese (by reactions like those shown above) or chromium:

$$2Al+Cr_2O_3\rightarrow Al_2O_3+2Cr+heat$$

These or similar reactions can also be used to control or eliminate elements which may be undesirable in certain situations or in certain quantities, such as aluminum, silicon, or titanium. That is, these or similar reactions can be utilized in a welding operation to selectively consume elements from the welding environment.

Non-limiting examples of reactive elements that can be included in a welding consumable such as an electrode composition, include magnesium, silicon, titanium, zirconium, aluminum, and combinations thereof.

Non-limiting examples of oxides that can be included in a welding consumable such as an electrode composition, include iron oxide and manganese oxide, and combinations thereof.

In accordance with the present invention, many combinations of reactive elements and oxides can be used in this same fashion. In theory, any reaction that is thermodynamically possible is capable of either absorbing (endothermic) or creating (exothermic) heat. The reaction between aluminum metal and iron oxide previously set forth, is one of the most strongly exothermic. But, in addition to iron, manganese and silicon oxides, aluminum can also react exothermically with oxides of boron, carbon, titanium, vanadium, chromium, cobalt, nickel, copper, zirconium, niobium and molybdenum, for example to name only those elements that play significant roles in the metallurgy of steels. Magnesium can react exothermically with oxides of boron, carbon, silicon, titanium, vanadium, chromium, iron, cobalt, nickel, copper, zirconium, niobium, and molybdenum. Zirconium can react exothermically with oxides of boron, carbon, silicon, vanadium, chromium, manganese, iron, cobalt, nickel, copper, niobium, and molybdenum. Titanium can react exothermically with oxides of boron, carbon, vanadium, chromium, manganese, iron, cobalt, nickel, copper, niobium, and molybdenum. Silicon can react exothermically with oxides of carbon, manganese, iron, cobalt, nickel, and copper.

The noted reactive elements and oxides that undergo exothermic reactions can be incorporated in a welding consumable, and preferably a cored electrode.

A cored electrode is a continuously fed tubular metal sheath with a core of powdered flux and/or alloying ingredients. These may include fluxing elements, deoxidizing and denitriding agents, and alloying materials, as well as elements that increase toughness and strength, improve corrosion resistance, and stabilize the arc. Typical core materials may include aluminum, calcium, carbon, chromium, iron, manganese, and other elements and materials. While flux-cored electrodes are more widely used, metal cored products are useful for adjusting the filler metal composition when welding alloy steels. The powders in metal cored electrodes generally are metal and alloy powders, rather than compounds, producing only small islands of slag on the face of the weld. By contrast, flux-cored electrodes produce an extensive slag cover during welding, which supports and shapes the bead.

By use of particular combinations, amounts, and/or proportions of reactive element(s) and oxide(s) in welding consumables, such as for example cored electrodes, it is possible to selectively adjust the heat generated in the arc, and thus, the temperature of the arc. Selective adjustment and control of arc temperature enables modification and control of metal deposition rates, without resort to adjusting power input levels to the welding unit.

In addition, by use of particular combinations, amounts, and/or proportions of reactive element(s) and oxide(s) in welding consumables, for example cored electrodes, it is possible to selectively achieve desired cooling rates and thereby achieve corresponding weld metal properties, without resort to adjusting power input levels to the welding unit.

Furthermore, by use of particular combinations, amounts, and/or proportions of reactive element(s) and oxide(s) in welding consumables, such as for example cored electrodes, it is possible to selectively modify the weld metal composition and thereby control formulation of certain phases in the weld metal. Again, this selective control is without resort to adjusting power input levels to the welding unit.

Moreover, by use of particular combinations, amounts, and/or proportions of reactive element(s) and oxide(s) in welding consumables, such as cored electrodes for example, it is possible to modify operating ranges of such consumables for particular applications. This selective tailoring of welding consumables to a desired application can be performed without resort to adjusting power input levels to the welding unit.

The thermal energy output from an arc generated by an arc welding unit can be increased without increasing the electrical power to the arc welding unit. The increased thermal energy output is achieved by utilizing a welding consumable that includes at least one reactive element and at least one oxide, which undergo one or more exothermic reaction(s) during arc welding to thereby generate the increased thermal energy output of the arc. The amounts and proportions of the reactive element(s) and oxide(s) can be selected to produce a desired amount of increased thermal energy output by appropriately summing the respective heats of reaction. The extent of increase can be from about 1% to about 100% or more, and typically from about 5% to about 15%. As will be appreciated, it is generally preferred to achieve as large an increase as possible, so long as desirable welding characteristics and properties are produced.

In addition to increasing thermal energy outputs of arcs, while not increasing electrical power demands; a method for achieving the same thermal energy output from an arc, while decreasing electrical power demands is provided. This method comprises using a welding consumable that includes at least one reactive metal and at least one oxide which undergo one or more exothermic reaction(s) during arc welding. The heat evolved from the exothermic reaction(s) contributes to the energy of the arc, thereby reducing electrical power demands on the arc welder. The amounts and proportions of the reactive element(s) and oxide(s) can be selected to produce a desired amount of increased thermal energy output by appropriately summing the respective heats of reaction. The extent of decreased electrical power demands can be from about 1% to about 100% or more, and typically is from about 5% to about 15%. It is generally preferred to achieve as large of an increase as possible, so long as desirable welding characteristics and properties are produced.

COMPARATIVE EXAMPLE

When welding with a typical "conventional" self-shielded flux-cored arc welding (FCAW-S) electrode, the 0.078 inch diameter electrode is fed into the arc at a rate of 90 inches per minute. The process uses direct current, electrode negative. Arc voltage is set at 19 to 20 volts. Current fluctuates somewhat in order to maintain a constant electrode melt-off rate. Under these conditions the arc develops an average power of about 4.4 kilowatts or 264,000 joules per minute.

However, when welding at the same melt-off rate with waveform controlled alternating current, the arc power is about 4.1 kilowatts or 246,000 joules per minute, about 7% less than in the conventional process. This lower arc power is associated with shorter physical arc length, which has advantages in terms of reduced exposure of the arc and the weld puddle to contamination from the atmosphere. However, the lower power also means that the weld puddle and the slag tend to freeze more quickly, sometimes before the weld metal has a chance to wet and fuse properly into the joint. This may result in "cold laps," slag entrapment, and other weld defects.

In addition to the heat generated by the passage of electricity through the welding arc, another strategy of adding heat to the weld is via exothermic chemical reactions between materials in the electrode core. The "conventional" FCAW-S electrode referred to above contains aluminum metal and 2.8% by weight of iron oxide. In the conventional electrode the iron oxide is incorporated to give stability against moisture pickup by certain other compounds, not necessarily to generate heat. However, from analysis of the weld metal and slag, it is known that about 60% of the iron oxide reacts with aluminum according to the following:

$$2Al+Fe_2O_3 \rightarrow Al_2O_3+2Fe$$

The metallic iron produced becomes part of the steel in the weld deposit, and the aluminum oxide forms part of the slag. When welding at a melt-off rate of 90 inches of wire per minute this reaction liberates approximately 3,800 joules per minute.

Additional reactants have been added to the cores of FCAW-S electrodes used with waveform controlled alternating current to compensate for the lower arc power. A representative electrode of this type contains 6% by weight of iron oxide, plus 1.85% of manganese oxide, plus 0.7% of silicon dioxide, along with sufficient metallic aluminum. The oxides of manganese and silicon also react with the aluminum:

$$4Al+3MnO_2 \rightarrow 2Al_2O_3+3Mn$$

$$4Al+3SiO_2 \rightarrow 2Al_2O_3+3Si$$

From analysis of weld metal and slag it is known that about 60% of the manganese oxide and 50% of the silicon dioxide react with the aluminum. The three reactions together generate a total of 19,300 joules per minute when welding at a melt-off rate of 90 inches of wire per minute.

For the conventional process:

264,000 J/min (arc energy)+3,800 J/min (exothermic reactions)=267,800 J/min (total)

For the waveform controlled alternating current process:

246,000 J/min (arc energy)+19,300 J/min (exothermic reactions)=265,300 J/min (total)

The difference in heat generated between the two processes is only about 1%. With the additional heat from the exothermic reactions the waveform controlled process produces welds with shape, wetting, and fusion comparable to the conventional process.

Additional details of arc welding materials and specifically, cored electrodes for welding are provided in U.S. Pat. Nos. 5,369,244; 5,365,036; 5,233,160; 5,225,661; 5,132,514; 5,120,931; 5,091,628; 5,055,655; 5,015,823; 5,003,155; 4,833,296; 4,723,061; 4,717,536; 4,551,610; and 4,186,293; all of which are hereby incorporated by reference.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

Having thus defined the invention, the following is claimed:

1. A method for increasing the thermal energy output in an arc welding operation using an arc welding unit, without increasing electrical power to the arc welding unit, the method comprising:

utilizing a welding consumable in an arc welding operation, the welding consumable comprising reagents for an exothermic reaction, the reagents consisting essentially of (i) at least one reactive element selected from the group consisting of magnesium, silicon, titanium, zirconium, aluminum, and combinations thereof and (ii) at least one oxide, wherein (i) and (ii) are selected, and in amounts and proportions such that at least one exothermic reaction occurs during the arc welding operation between (i) and (ii) which thereby generates a predetermined amount of energy which increases the thermal energy output in an arc welding operation without increasing electrical power to the arc welding unit.

2. The method of claim 1 wherein the oxide (ii) is selected from the group consisting of iron oxide, manganese oxide, and combinations thereof.

3. The method of claim 1 wherein the reactive element (i) is aluminum and the oxide (ii) is selected from the group consisting of iron oxide, manganese oxide, silicon oxide, boron oxide, carbon oxide, titanium oxide, vanadium oxide, chromium oxide, cobalt oxide, nickel oxide, copper oxide, zirconium oxide, niobium oxide, molybdenum oxide, and combinations thereof.

4. The method of claim 1 wherein the reactive element (i) is magnesium and the oxide (ii) is selected from the group consisting of boron oxide, carbon oxide, silicon oxide, titanium oxide, vanadium oxide, chromium oxide, iron oxide, cobalt oxide, nickel oxide, copper oxide, zirconium oxide, niobium oxide, molybdenum oxide, and combinations thereof.

5. The method of claim 1 wherein the reactive element (i) is zirconium and the oxide (ii) is selected from the group consisting of boron oxide, carbon oxide, silicon oxide, vanadium oxide, chromium oxide, manganese oxide, iron oxide, cobalt oxide, nickel oxide, copper oxide, niobium oxide, molybdenum oxide, and combinations thereof.

6. The method of claim 1 where in the reactive element (i) is titanium and the oxide (ii) is selected from the group consisting of boron oxide, carbon oxide, vanadium oxide, chromium oxide, manganese oxide, iron oxide, cobalt oxide, nickel oxide, copper oxide, niobium oxide, molybdenum oxide, and combinations thereof.

7. The method of claim 1 wherein the reactive element (i) is silicon and the oxide (ii) is selected from the group consisting of carbon oxide, manganese oxide, iron oxide, cobalt oxide, nickel oxide, copper oxide, and combinations thereof.

8. The method of claim 1 wherein the welding consumable is a flux cored electrode.

9. A method for achieving the same thermal energy output in an arc welding operation using an arc welding unit, while decreasing electrical power to the arc welding unit the method comprising:

utilizing a welding consumable in an arc welding operation, the welding consumable comprising reagents for an exothermic reaction, the reagents consisting essentially of (i) at least one reactive element selected from the group consisting of magnesium, silicon, titanium, zirconium, aluminum, and combinations thereof, and (ii) at least one oxide, wherein (i) and (ii) are selected, and in amounts and proportions such that at least one exothermic reaction occurs during the arc welding operation between (i) and (ii) which thereby generates a predetermined amount of energy, which maintains the thermal energy output in an arc welding operation while decreasing electrical power to the arc welding unit by a predetermined amount.

10. The method of claim 9 wherein the oxide (ii) is selected from the group consisting of iron oxide, manganese oxide, and combinations thereof.

11. The method of claim 9 wherein the reactive element (i) is aluminum and the oxide (ii) is selected from the group consisting of iron oxide, manganese oxide, silicon oxide, boron oxide, carbon oxide, titanium oxide, vanadium oxide, chromium oxide, cobalt oxide, nickel oxide, copper oxide, zirconium oxide, niobium oxide, molybdenum oxide, and combinations thereof.

12. The method of claim 9 wherein the reactive element (i) is magnesium and the oxide (ii) is selected from the group consisting of boron oxide, carbon oxide, silicon oxide, titanium oxide, vanadium oxide, chromium oxide, iron oxide, cobalt oxide, nickel oxide, copper oxide, zirconium oxide, niobium oxide, molybdenum oxide, and combinations thereof.

13. The method of claim 9 wherein the reactive element (i) is zirconium and the oxide (ii) is selected from the group consisting of boron oxide, carbon oxide, silicon oxide, vanadium oxide, chromium oxide, manganese oxide, iron oxide, cobalt oxide, nickel oxide, copper oxide, niobium oxide, molybdenum oxide, and combinations thereof.

14. The method of claim 9 where in the reactive element (i) is titanium and the oxide (ii) is selected from the group consisting of boron oxide, carbon oxide, vanadium oxide, chromium oxide, manganese oxide, iron oxide, cobalt oxide, nickel oxide, copper oxide, niobium oxide, molybdenum oxide, and combinations thereof.

15. The method of claim 9 wherein the reactive element (i) is silicon and the oxide (ii) is selected from the group consisting of carbon oxide, manganese oxide, iron oxide, cobalt oxide, nickel oxide, copper oxide, and combinations thereof.

16. The method of claim 9 wherein the welding consumable is a flux cored electrode.

* * * * *